(12) United States Patent
Suzuki

(10) Patent No.: US 8,451,462 B2
(45) Date of Patent: May 28, 2013

(54) IMAGE FORMING APPARATUS, IMAGE FORMING METHOD, AND STORAGE MEDIUM

(75) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/755,297

(22) Filed: Apr. 6, 2010

(65) Prior Publication Data

US 2010/0259777 A1      Oct. 14, 2010

(30) Foreign Application Priority Data

Apr. 9, 2009  (JP) .................. 2009-095124

(51) Int. Cl.
*G06F 15/00* (2006.01)
*G06K 1/00* (2006.01)

(52) U.S. Cl.
USPC ............ 358/1.11; 358/1.1; 358/1.13; 358/1.9

(58) Field of Classification Search
None
See application file for complete search history.

(56) References Cited

U.S. PATENT DOCUMENTS

| 7,440,143 | B2 | 10/2008 | Suzaki | |
|---|---|---|---|---|
| 2003/0169456 | A1 | 9/2003 | Suzaki | |
| 2006/0053137 | A1* | 3/2006 | Tanimoto | 707/101 |
| 2007/0217852 | A1* | 9/2007 | Handa et al. | 400/615.2 |

FOREIGN PATENT DOCUMENTS

| CN | 1849813 A | 10/2006 |
|---|---|---|
| JP | 2003-264685 A | 9/2003 |
| JP | 2004-013287 A | 1/2004 |

* cited by examiner

*Primary Examiner* — Thierry Pham
(74) *Attorney, Agent, or Firm* — Canon U.S.A., Inc. IP Division

(57) ABSTRACT

An apparatus includes a specification unit configured to specify character information included in document data, a generation unit configured to generate image data of the specified character information, a conversion unit configured to convert the generated image data or a parity value of the generated image data into a two-dimensional code, and a printing unit configured to print a printed matter in which the two-dimensional code is combined with the document data, wherein a size of the generated image data is smaller than a size of image data of the document data.

9 Claims, 20 Drawing Sheets

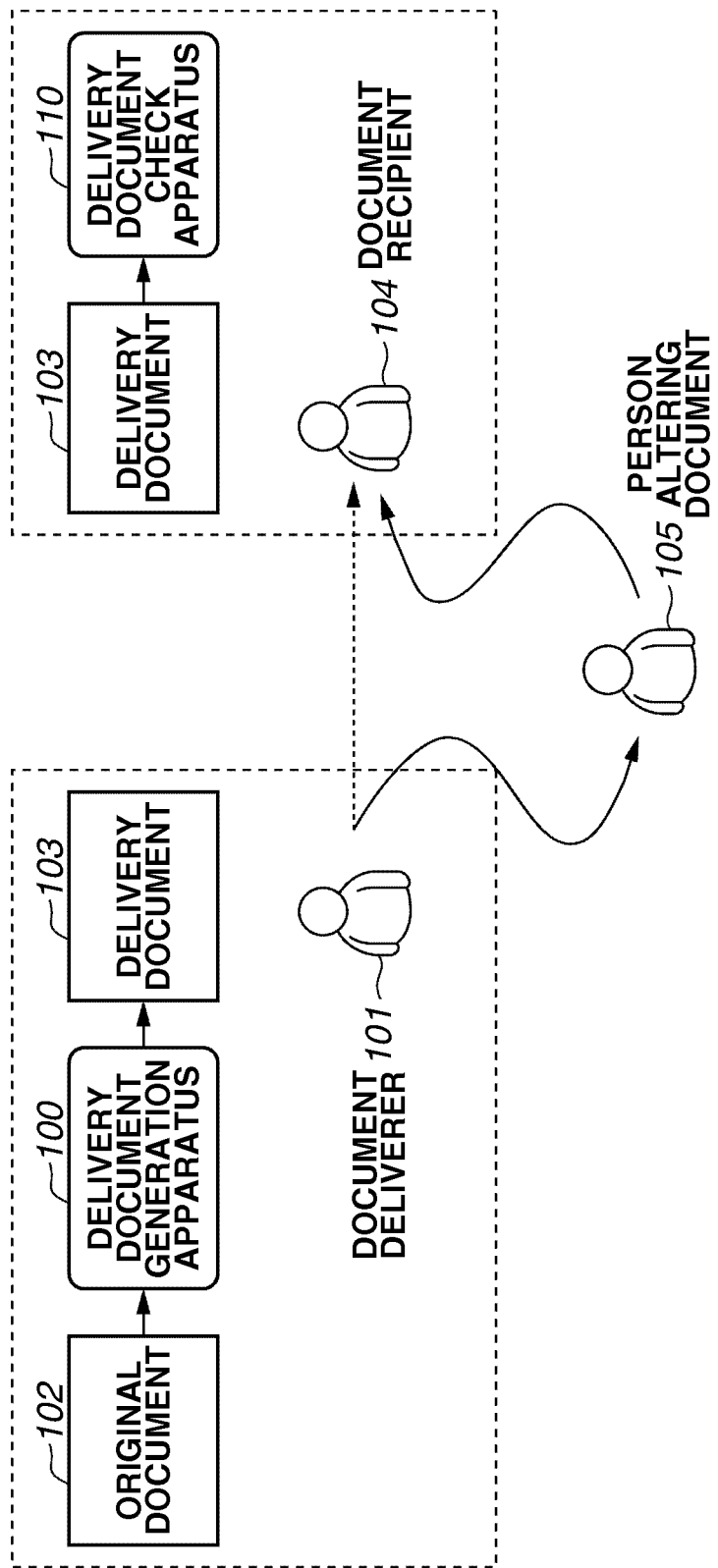

FIG.14A

| PAYMENT DETAILS | 1401 |
|---|---|
| 01XXXXXXXXXX | ¥123456789 |
| 02XXXXXXXXXX | ¥123456789 |
| 03XXXXXXXXXX | ¥123456789 |
| 04XXXXXXXXXX | ¥123456789 |
| 05XXXXXXXXXX | ¥123456789 |
| 06XXXXXXXXXX | ¥123456789 |
| 07XXXXXXXXXX | ¥123456789 |
| 08XXXXXXXXXX | ¥123456789 |
| 09XXXXXXXXXX | ¥123456789 |
| 10XXXXXXXXXX | ¥123456789 |
| 11XXXXXXXXXX | ¥123456789 |
| 12XXXXXXXXXX | ¥123456789 |
| 13XXXXXXXXXX | ¥123456789 |
| 14XXXXXXXXXX | ¥123456789 |
| 15XXXXXXXXXX | ¥123456789 |
| 16XXXXXXXXXX | ¥123456789 |
| 17XXXXXXXXXX | ¥123456789 |
| 18XXXXXXXXXX | ¥123456789 |
| 19XXXXXXXXXX | ¥123456789 |
| 20XXXXXXXXXX | ¥123456789 |
| 21XXXXXXXXXX | ¥123456789 |
| 22XXXXXXXXXX | ¥123456789 |
| 23XXXXXXXXXX | ¥123456789 |

FIG.14B

PAYMENT DETAILS — 1402
01XXXXXXXXXXXX¥123456789
02XXXXXXXXXXXX¥123456789
03XXXXXXXXXXXX¥123456789
04XXXXXXXXXXXX¥123456789
05XXXXXXXXXXXX¥123456789
06XXXXXXXXXXXX¥123456789
07XXXXXXXXXXXX¥123456789
08XXXXXXXXXXXX¥123456789
09XXXXXXXXXXXX¥123456789
10XXXXXXXXXXXX¥123456789
11XXXXXXXXXXXX¥123456789
12XXXXXXXXXXXX¥123456789
13XXXXXXXXXXXX¥123456789
14XXXXXXXXXXXX¥123456789
15XXXXXXXXXXXX¥123456789
16XXXXXXXXXXXX¥123456789
17XXXXXXXXXXXX¥123456789
18XXXXXXXXXXXX¥123456789
19XXXXXXXXXXXX¥123456789
20XXXXXXXXXXXX¥123456789
21XXXXXXXXXXXX¥123456789
22XXXXXXXXXXXX¥123456789
23XXXXXXXXXXXX¥123456789

IMAGE FORMING APPARATUS, IMAGE FORMING METHOD, AND STORAGE MEDIUM

BACKGROUND OF THE INVENTION

1. Field of the Invention

The present invention relates to an image forming apparatus, an image forming method, and a computer program, and in particular to the same suitable for detecting alteration of a printed matter.

2. Description of the Related Art

In order to detect alteration of an original document of printing, a conventional technique has been discussed that provides a printing output of a delivery document with additional information about an original document. Japanese Patent Application Laid-Open No. 2003-264685 discusses a technique which adds (embeds) an image feature quantity of a document image of an original document to a delivery document and performs printing and outputting.

In Japanese Patent Application Laid-Open No. 2003-264685, alteration of the delivery document is detected by calculating an image feature quantity from the delivery document. The calculated image feature quantity is compared with the image feature quantity added to the delivery document, and the alteration of the original document can be detected based on a comparison result.

Japanese Patent Application Laid-Open No. 2004-13287 discusses a technique that obtains character code information from an original document by an optical character reader (OCR) function, adds to a delivery document information including an authentication value calculated by a predetermined operation from the character code information and layout information, and performs printing and outputting.

In Japanese Patent Application Laid-Open No. 2004-13287, alteration of the original document is detected by obtaining the information added to the delivery document which is optically read. Subsequently, the layout information is acquired from the obtained information, and character string information is obtained from the delivery document by the OCR function according to the acquired layout information. The authentication value calculated form the predetermined operation is compared with an original authentication value included in the information added to the delivery document, and the alteration of the original document can be detected based on a comparison result. Further, the information described above is stored in an authentication agency when the delivery document is printed and output. When the alteration of the original document is be detected, the information is inquired to the authentication agency and the alteration of the original document can be detected by comparing the original authentication value included in the inquired information with the authentication value calculated by the predetermined operation.

However, the conventional techniques described above include situations as below.

According to Japanese Patent Application Laid-Open No. 2003-264685, an image is divided into blocks and an image feature quantity is defined by any of (1) a frequency spectrum, (2) a value of a result of performing arbitrary filtering processing, and (3) a ratio of white pixels and black pixels in a block image, of each block. However, any of image feature quantities described above includes too less information for authenticating a document or the information having too large size. Thus, it may be difficult to accurately detect the alteration of the document, or perform printing of the delivery document by adding the image feature quantity. Further, when dusts or stains are adhered onto the delivery document, the image feature quantity is changed and it may be difficult to accurately detect the alteration of the document.

In Japanese Patent Application Laid-Open No. 2004-13287, if the document is not altered, a reading result by the OCR when the delivery document is printed may be different from a reading result by the OCR when authentication is performed due to a situation of a reading accuracy of the OCR. Accordingly, it may be difficult to accurately detect the alteration of the document.

SUMMARY OF THE INVENTION

According to an aspect of the present invention, an apparatus includes a specification unit configured to specify character information included in document data, a generation unit configured to generate image data of the specified character information, a conversion unit configured to convert the generated image data or a parity value of the generated image data into a two-dimensional code, and a printing unit configured to print a printed matter in which the two-dimensional code is combined with the document data, wherein a size of the generated image data is smaller than a size of image data of the document data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 schematically illustrates an example of a document management system.

FIGS. 14A and 14B respectively illustrate examples of original document image data and image data obtained by packing character areas in the original document image data.

DESCRIPTION OF THE EMBODIMENTS

Figure 2A:
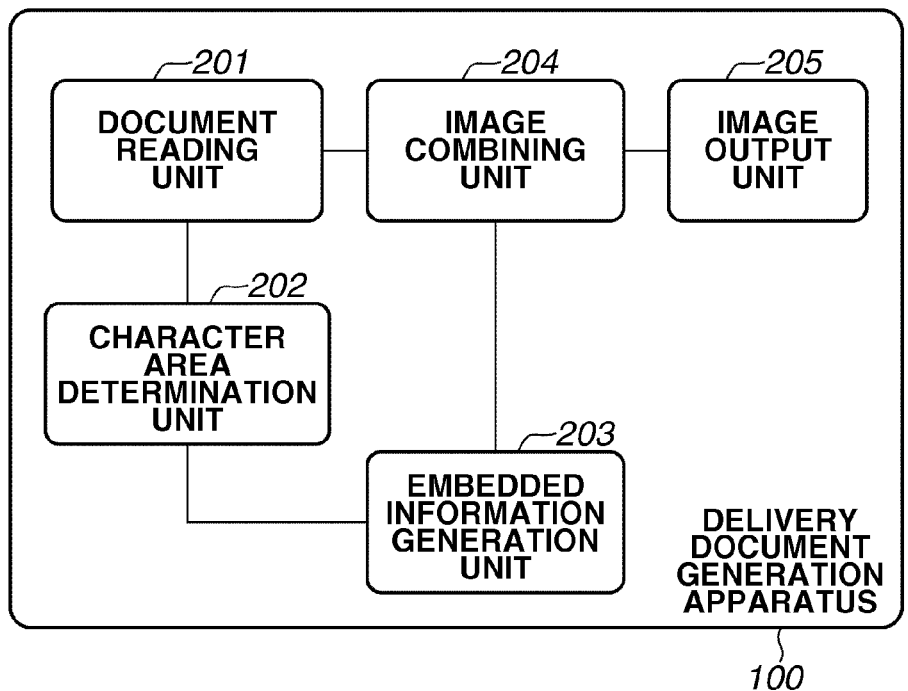
FIGS. 2A and 2B are block diagrams illustrating examples of configurations of a delivery document generation apparatus and a delivery document check apparatus.

Various exemplary embodiments, features, and aspects of the invention will be described in detail below with reference to the drawings.

A first exemplary embodiment will be described below with reference to the drawings.

FIG. 1 schematically illustrates an example of a document management system.

In FIG. 1, the document management system includes a delivery document generation apparatus 100 and a delivery document check apparatus 110.

A document deliverer 101 operates the delivery document generation apparatus 100 to obtain from an original document 102 a delivery document 103 from which alteration can be detected. The document deliverer 101 transmits the delivery document 103 to a document recipient 104. However, the delivery document 103 received by the document recipient 104 can be altered by a person 105 who alters the document. Therefore, the document recipient 104 causes the delivery document check apparatus 110 to read the received delivery document 103 to check that the received delivery document 103 is not altered.

Figure 2B:
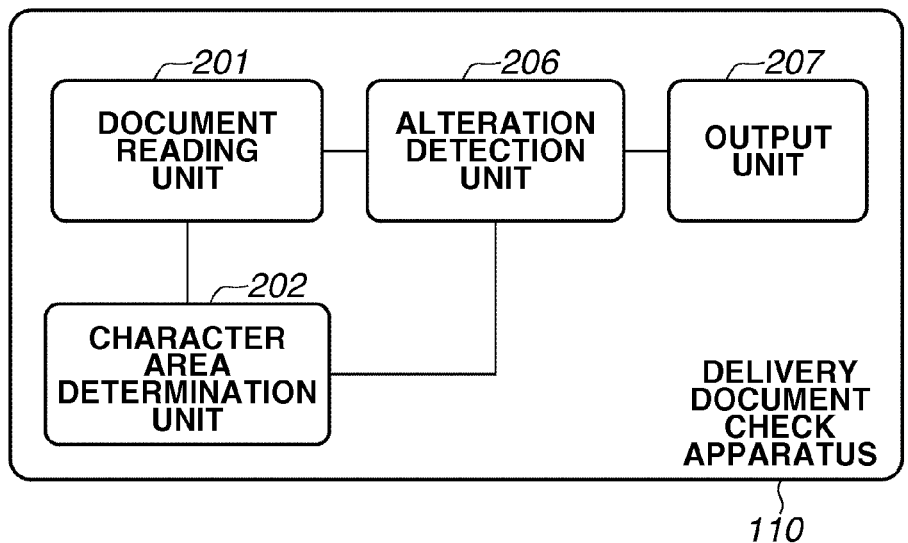

Examples of configurations of the delivery document generation apparatus 100 and the delivery document check apparatus 110 will be described. FIG. 2A is a block diagram illustrating an example of the configuration of the delivery document generation apparatus 100. FIG. 2B is a block diagram illustrating an example of the configuration of the delivery document check apparatus 110. Same reference numerals are given to blocks that have same or similar functions in FIGS. 2A and 2B.

The example of the configuration of the delivery document generation apparatus 100 illustrated in FIG. 2A will be described. The delivery document generation apparatus 100 can be realized, for example, by a multifunction product (MFP). However, the delivery document generation apparatus 100 is not limited to the MFP. For example, the delivery document generation apparatus 100 can be realized using a personal computer, a scanner and a printer.

A document reading unit 201 includes a scanner and optically scans an input original image (the original document 102) to form electronic original document image data. A character area determination unit 202 searches the original document image data formed by the document reading unit 201 for a character area including character information. According to the present exemplary embodiment, a rectangular area is defined as the character area.

An embedded information generation unit 203 generates a two-dimensional code to be added to the delivery document 103 from the information about the character area searched by the character area determination unit 202. An image combining unit 204 combines the original document image data formed by the document reading unit 201 with the two-dimensional code generated by the embedded information generation unit 203 to generate image data of the delivery document 103. An image output unit 205 includes a printer engine and prints the image data of the delivery document 103 generated by the image combining unit 204 onto paper.

The example of the configuration of the delivery document check apparatus 110 illustrated in FIG. 2B will be described. The delivery document check apparatus 110 can be realized, for example, by an MFP. However, the delivery document check apparatus 110 is not limited to the MFP. For example, the delivery document check apparatus 110 can be realized using a personal computer, a scanner and a printer.

A document reading unit 201 of the delivery document check apparatus 110 includes a scanner, optically scans the delivery document 103, and reads information thereof to form electronic delivery document image data. A character area determination unit 202 searches the image data of the delivery document formed by the document reading unit 201 for a character area.

An alteration detection unit 206 detects an altered area based on the delivery document image data formed by the document reading unit 201 and the information about the character area searched by the character area determination unit 202. An output unit 207 includes a computer display for displaying a result detected by the alteration detection unit 206.

An example of an operation performed by the character area determination unit 202 will be described in detail.

The character area determination unit 202 searches for all character areas including characters as rectangular areas from the original document image data formed by the document reading unit 201. According to the present exemplary embodiment, the character area determination unit 202 searches for the character area by a method using a histogram.

Figure 3:
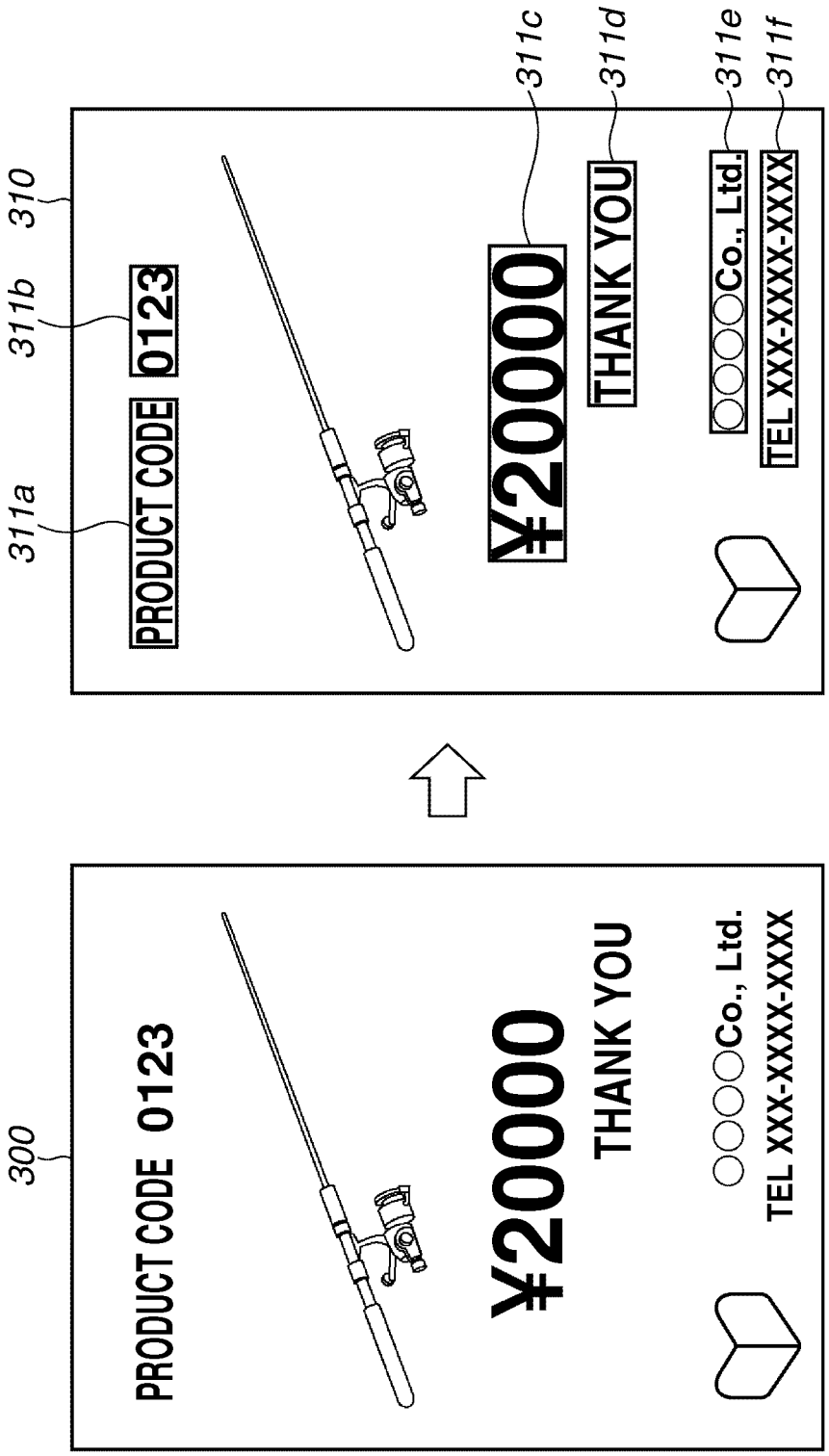
FIG. 3 schematically illustrates an example in which character areas are searched.

FIG. 3 schematically illustrates an example in which character areas are searched for.

In FIG. 3, original document image data 300 is used to determine the character area by the character area determination unit 202. Original document image data 310 is subjected to determination of character areas and includes character areas 311a, 311b, 311c, 311d, 311e, and 311f which are searched. Each searched character area 311a, 311b, 311c, 311d, 311e, or 311f is expressed, for example, by values of a top-left coordinate, a height and a width of each character area 311a, 311b, 311c, 311d, 311e, or 311f. The value of the top-left coordinate of each character area 311a, 311b, 311c, 311d, 311e, or 311f has an original point at the top-left point of the original document image data 310. In descriptions below, when the character areas 311a to 311f are not distinguished from each other, these character areas are generally referred to as a character area 311.

Figure 4:
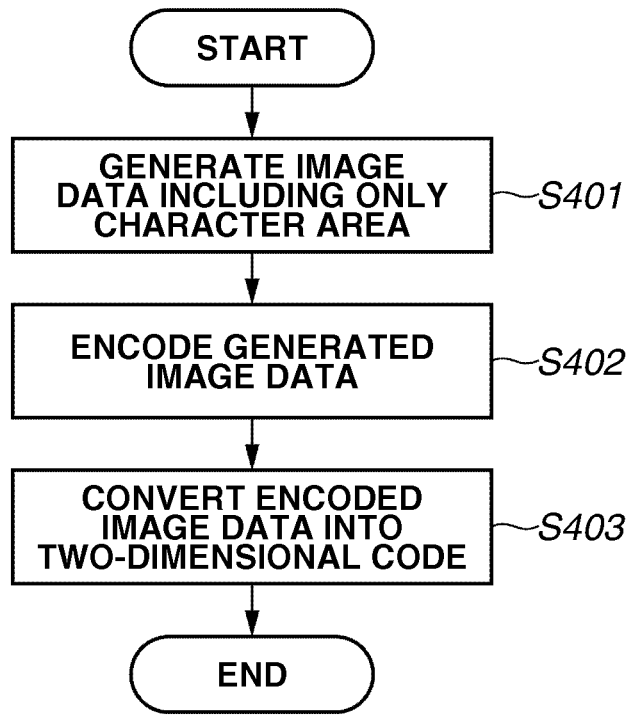
FIG. 4 is a flowchart illustrating an example of an operation performed by an embedded information generation unit in the delivery document generation apparatus.

With reference to a flowchart illustrated in FIG. 4, an example of an operation performed by the embedded information generation unit 203 of the delivery document generation apparatus 100 will be described.

In step S401, the embedded information generation unit 203 generates image data which includes only the character area 311 searched by the character area determination unit 202, for each of all character areas 311. A size (sizes of height and width) of the image data generated in step S401 is smaller than that of the original document image data 300 formed by the document reading unit 201. Processing in step S401 will be described in detail below.

In step S402, the embedded information generation unit 203 encodes the image data generated in step S401. As for an encoding method in step S402, reversible transformation for compressing the image data generated in step S401 is being used. For example, in step S402, encoding such as portable network graphics (PNG) and a tagged image file format (TIFF) can be used.

In step S403, the embedded information generation unit 203 converts an encoded result into a two-dimensional code. The two-dimensional code in the present exemplary embodiment may have a format which can print the encoded result on paper. For example, in step S403, codes such as the Veri Code (registered trademark), the QR code (registered trademark), and the communication platform (CP) code can be used.

Figure 5:
FIG. 5 illustrates an example of image data generated by processing in step S401.
Figure 6:
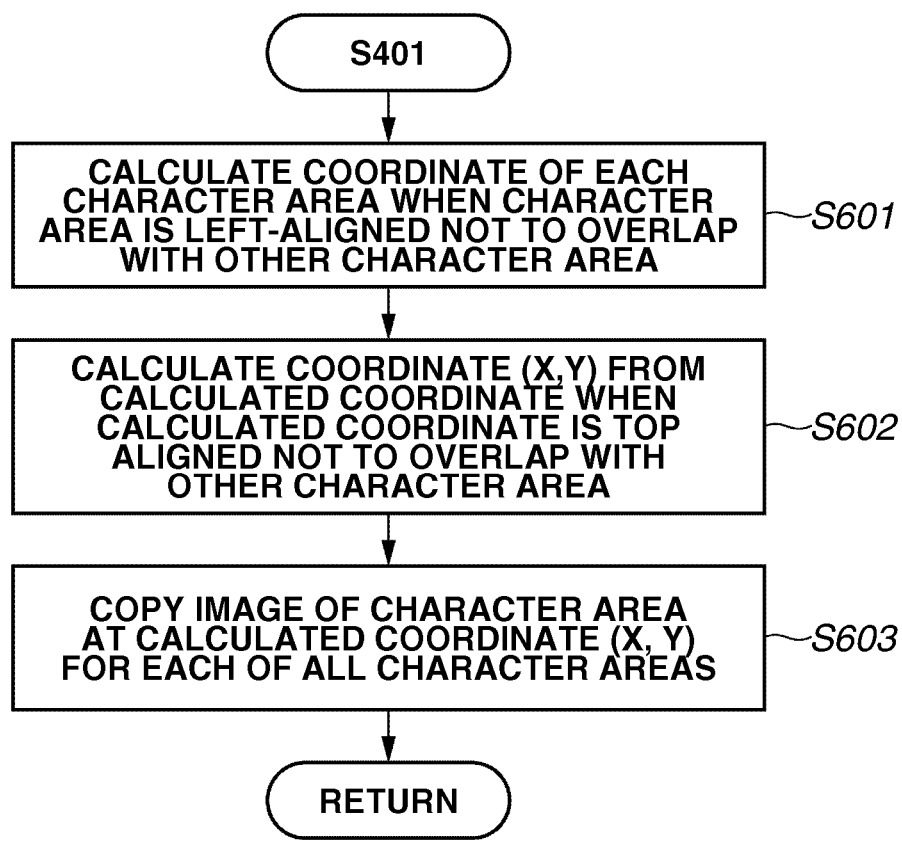
FIG. 6 is a flowchart illustrating an example of the processing in step S401 in detail.
Figure 7:
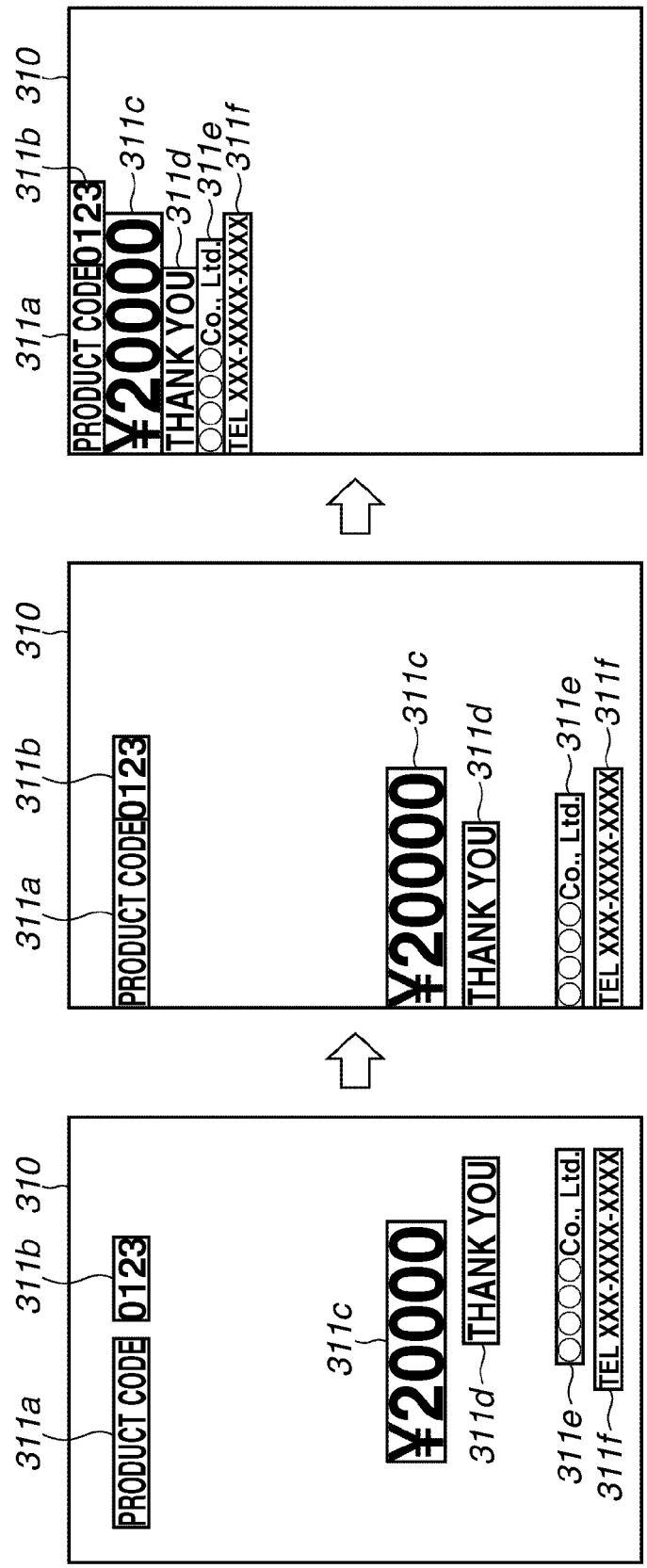
FIG. 7 schematically illustrates an example in which image data is formed by the processing of the flowchart in FIG. 6.

With reference to FIGS. 5 and 7 and a flowchart in FIG. 6, an example of processing in step S401 in FIG. 4 will be described in detail. FIG. 5 illustrates an example of the image data generated by the processing in step S401 in FIG. 4. FIG. 7 schematically illustrates an example in which image data is formed by processing of the flowchart in FIG. 6.

In step S401, the embedded information generation unit 203 forms image data 501 illustrated in FIG. 5 from the original document image data 300 illustrated in FIG. 3.

In step S601 in FIG. 6, the embedded information generation unit 203 calculates coordinate values (X, Y) of each character area 311 when each of all the character areas 311 searched by the character area determination unit 202 is left-aligned not to overlap with other character area 311. A state of the original document image data 310 when each character area 311 is left-aligned is illustrated in a center diagram in FIG. 7.

In step S602, the embedded information generation unit 203 calculates coordinate values (X,Y) of each character area 311, from the coordinate values calculated in step S601, when each of the left-aligned character area 311 is top-aligned not to overlap with other character area 311. A state when each left-aligned character area 311 is top-aligned is illustrated in a right diagram in FIG. 7.

Finally, in step S603, the embedded information generation unit 203 copies all images of the character areas 311 disposed on the coordinates which are calculated in step S602 to generate the image data 501 illustrated in FIG. 5. A size (sizes of height and width) of the image data 501 generated in step S603 is calculated from the coordinate values calculated in step S602 and a size of each character area 311 itself. According to the present exemplary embodiment, the image data 501 is rectangular image data having a size enough to include all the character areas 311, and each pixel is initialized in white.

After the processing in step S401 is performed, the two-dimensional code is generated by the embedded information generation unit 203 performing the processing in steps S402 and S403 as described above. The image combining unit 204 combines the two-dimensional code with the original document image data 300 formed by the document reading unit 201.

Figure 8:
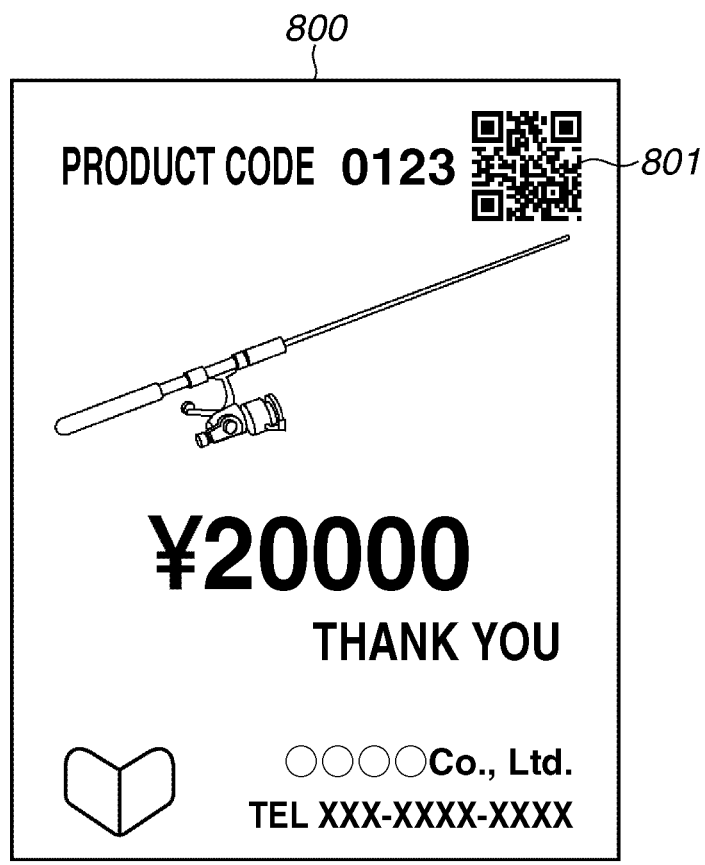
FIG. 8 illustrates an example of delivery document image data in which original document image data is combined with a two-dimensional code.

FIG. 8 illustrates an example of the delivery document image data in which the original document image data 300 is combined with the two-dimensional code. The image combining unit 204 searches for a blank area in the original document image data 300 where the two-dimensional code can be disposed, so that the two-dimensional code can be combined into the searched blank area.

The image combining unit 204 may combine the two-dimensional code into a predetermined area in the original document image data 300. When an area in which the two-dimensional code is combined is determined in advance, the area including no characters needs to be selected. As illustrated in FIG. 8, delivery document image data 800 includes a two-dimensional code 801 generated by the embedded information generation unit 203.

Figure 9:
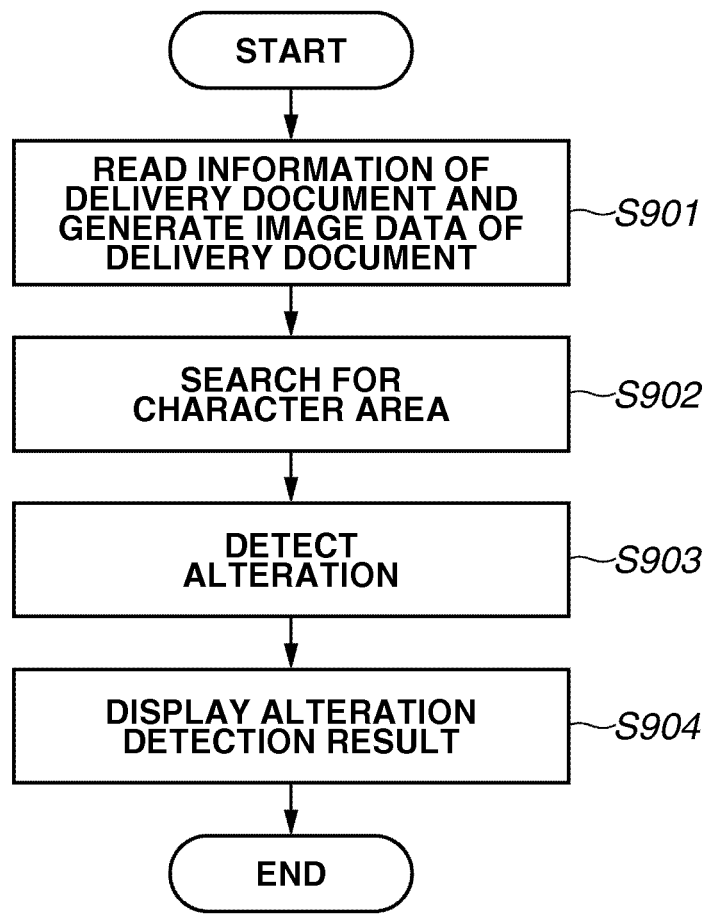
FIG. 9 is a flowchart illustrating an example of an operation by the delivery document check apparatus.

With reference to a flowchart illustrated in FIG. 9, an example of an operation performed by the delivery document check apparatus 110 will be described.

In step S901, the document reading unit 201 of the delivery document check apparatus 110 optically scans the delivery document (paper document) that is a target for detecting the alteration and reads information about the delivery document to form the electronic delivery document image data 800.

In step S902, the character area determination unit 202 of the delivery document check apparatus 110 searches the delivery document image data 800 formed in step S901 for the character areas.

The alteration detection unit 206 extracts the two-dimensional code 801 from the delivery document image data 800 formed by the document reading unit 201 and decodes the extracted two-dimensional code. In step S903, the alteration detection unit 206 detects the alteration of the delivery document by comparing the image data 501 obtained by decoding the two-dimensional code 801 with each character area searched in step S902. An operation performed by the delivery document check apparatus 110 in step S903 will be described in detail below.

In step S904, the output unit 207 of the delivery document check apparatus 110 outputs (displays) a result of detection of the alteration performed by the alteration detection unit 206. An operation performed by the output unit 207 in step S904 will be described in detail below.

Figure 10:
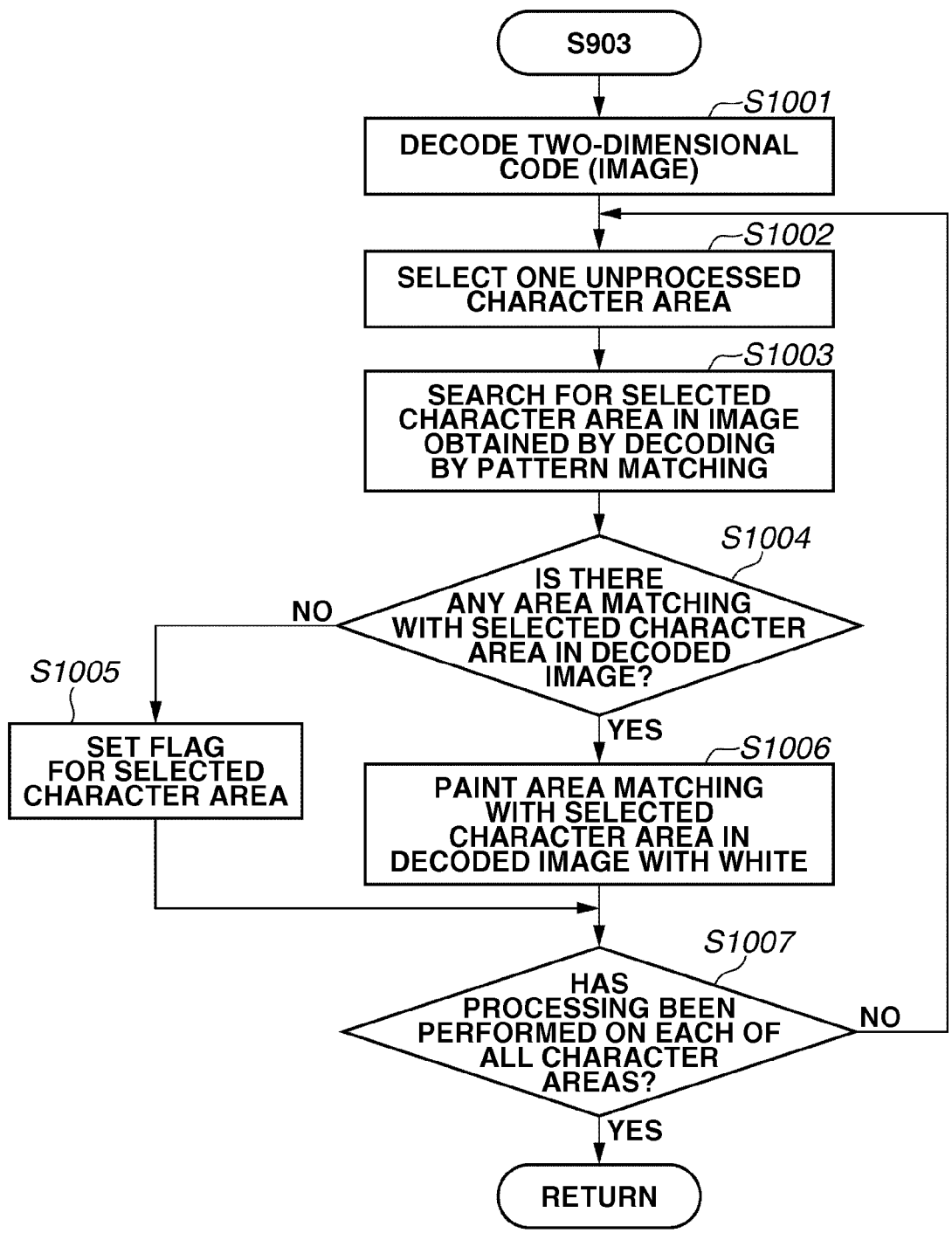
FIG. 10 is a flowchart illustrating an example of a detail operation performed by an alteration detection unit in step S903.

With reference to a flowchart illustrated in FIG. 10, an example of an operation performed by the alteration detection unit 206 in step S903 illustrated in FIG. 9 will be described in detail.

First, the alteration detection unit 206 detects the two-dimensional code 801 from the delivery document image data 800 formed by the document reading unit 201. In step S1001, the alteration detection unit 206 decodes "the two-dimensional code 801 including the character areas 311" generated by the embedded information generation unit 203 of the delivery document generation apparatus 100.

In step S1002, the alteration detection unit 206 selects an unprocessed character area from a plurality of character areas 311 searched by the character area determination unit 202.

In step S1003, the alteration detection unit 206 searches the image data 501 obtained by decoding the two-dimensional code 801 in step S1001 for the character area selected in step S1002 by pattern matching. For example, a feature quantity of each character in the character area in the image data 501 obtained by decoding the two-dimensional code 801 and each character in the character area selected in step S1002 are compared with a dictionary to perform the search in step S1003. Further, the search in step S1003 can be performed according to a similarity between the feature quantity of the character area in the image data 501 obtained by decoding the two-dimensional code 801 and that of the character area selected in step S1002.

Then in step S1004, the alteration detection unit 206 determines whether the character area selected in step S1002 is detected from the image data 501 obtained by decoding the two-dimensional code 801 in step S1001.

As a result of the determination, when the character area selected in step S1002 is detected from the image data 501 obtained by decoding the two-dimensional code 801 in step S1001 (YES in step S1004), the processing proceeds to step S1006. In step S1006, the alteration detection unit 206 paints an "area matching with the character area selected in step S1002" on the image data 501 white. The processing proceeds to step S1007 described below.

On the other hand, when the character area selected in step S1002 is not detected from the image data 501 obtained by decoding the two-dimensional code 801 in step S1001 (NO in step S1004), the processing proceeds to step S1005. The alteration detection unit 206 sets a flag indicating that the character area is not detected from the image data 501 obtained by decoding the two-dimensional code 801 in step S1001 for the character area selected in step S1002. The above-described processing is performed on all the character areas detected by the character area determination unit 202 of the delivery document check apparatus 110. The processing proceeds to step S1007.

In step S1007, the alteration detection unit 206 determines whether the processing after step S1002 has been performed on all the plurality of the character areas 311 searched by the character area determination unit 202. As a result of the determination, when the processing has not been performed on all the plurality of the character areas 311 searched by the character area determination unit 202 (NO in step S1007), the processing returns to step S1002. The processing in steps S1002 to S1007 is repeatedly performed until the processing is performed on all the plurality of character areas 311. When the processing is completed on all the plurality of character areas 311 (YES in step S1007), the processing of the flowchart in FIG. 10 is ended.

Figure 11:
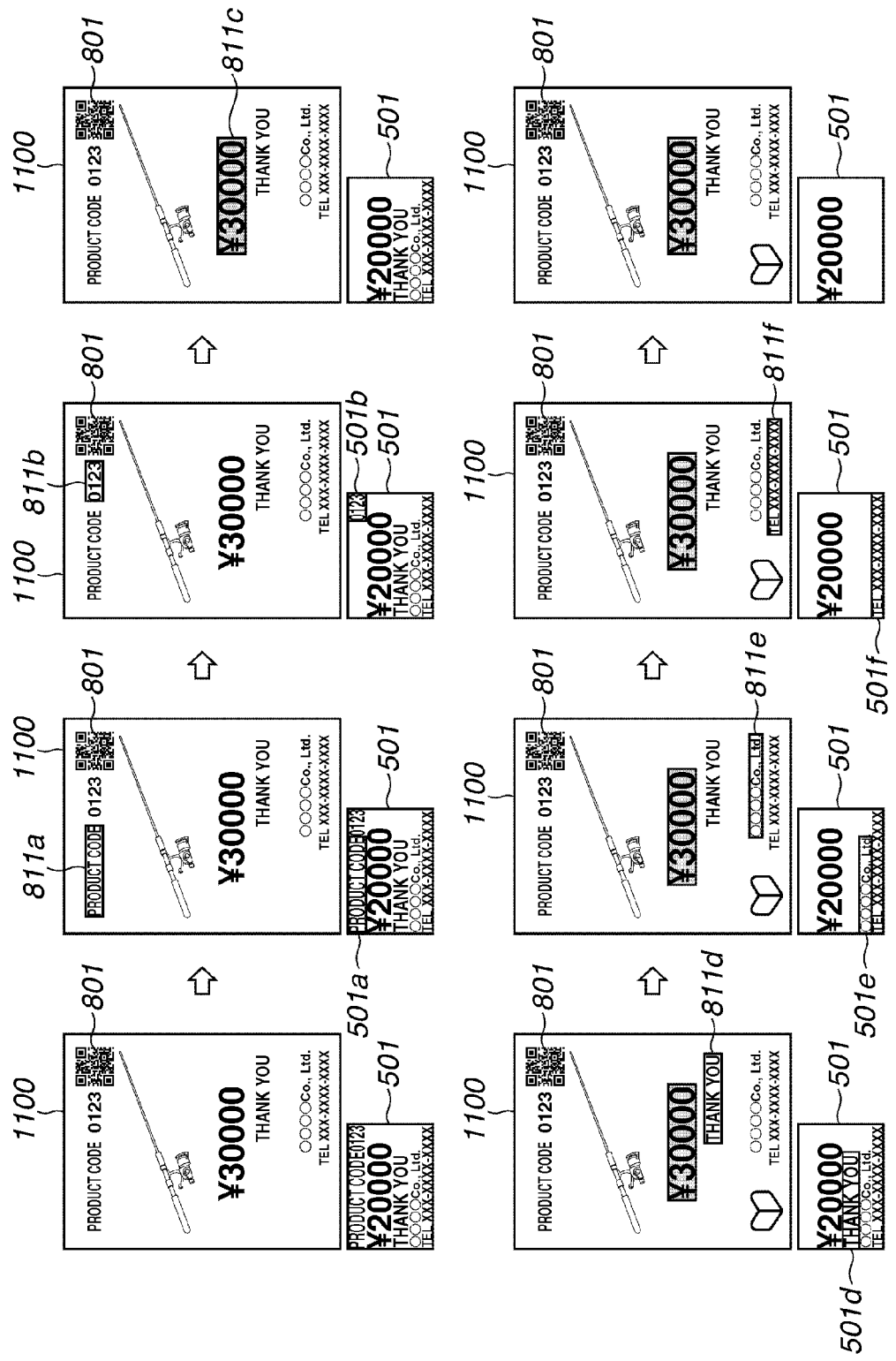
FIG. 11 schematically illustrates an example of image data for detecting whether the delivery document is altered.

An example of a specific operation performed by the alteration detection unit 206 will be described. FIG. 11 schematically illustrates an example of image data for detecting whether the delivery document is altered. FIG. 11 illustrates delivery document image data 1100 (delivery document) received by the document recipient 104. In the delivery document image data 1100, the delivery document image data 800 (refer to FIG. 8) output by the delivery document generation apparatus 100 is altered. A character string "¥20000" in the original document is altered to "¥30000". In FIG. 11, the image data 501 obtained by decoding the two-dimensional code added to the delivery document image data 1100 is illustrated beneath the delivery document image data 1100.

The alteration detection unit 206 selects a character area 811a of "product code". An image of the character area 811a of the "product code" matches with an image in a character area 501a in the image data 501 obtained by decoding the two-dimensional code 801. Therefore, the character area 501a in the image data 501 is pained white (refer to the third image data 501 from the left of an upper line illustrated in FIG. 11). The similar processing is performed on the character areas 811b, 811c, 811d, 811e, and 811f including "0123", "¥30000", "Thank you", "○○○○ co., Ltd.", "TEL XXX-XXXX-XXXX" respectively. The character area 811c of "¥30000" is not included in the image data 501. Thus, when the character area 811c of "¥30000" in the delivery document image data 1100 is selected, the above-described flag is set for the character area 811c of "¥30000".

In FIG. 11, shading provided to "¥30000" schematically indicates that the flag is set. When the alteration detection unit 206 completes pattern matching between each character area in the delivery document image data 1100 and that in the image data 501 as described above, states of the delivery document image data 1100 and the character area 501a are illustrated in right end diagrams of a lower line in FIG. 11.

Results detected by the alteration detection unit 206 are classified into three types as below.

(1) No flag is set for all the character areas 311 and 811. The image data 501 on which pattern matching has been performed is completely painted white.

In this case, the alteration detection unit 206 determines that the delivery document image data 800 is not altered. Accordingly, the output unit 207 displays a message indicating that the delivery document is not altered, as a graphical user interface (GUI), on a display provided to the delivery document check apparatus 110.

(2) The flag is set for at least any one of the character areas 811.

In this case, the alteration detection unit 206 determines that the character area 811 for which the flag is set is altered to other characters. Accordingly, the output unit 207 displays a message indicating that the delivery document is altered, as a GUI, on the display provided to the delivery document check apparatus 110. At this point, the output unit 207 may display an image like the right end image of the lower line in FIG. 11 so that the document recipient 104 can visually, easily understand which character string is altered. Alternatively, the output unit 207 may print on a sheet of paper a message indicating that the delivery document is altered.

(3) The flag is not set for the character area 811, however, the image data 501 on which pattern matching has been performed is not completely painted white.

In this case, the alteration detection unit 206 determines that apart of the character strings in the delivery document image data 800 is deleted. Accordingly, the output unit 207 displays a message indicating that the delivery document is altered, as a GUI, on the display provided to the delivery document check apparatus 110. At this point, the output unit 207 may display the image data 501 on which pattern matching has been performed to notify the document recipient 104 of which character string is deleted.

According to the present exemplary embodiment as described above, the character areas 311a to 311f are specified from the original document image data 310. The character areas 311a to 311f are packed in as small a size as possible such that the specified character areas 311a to 311f are not overlapped with each other, to generate the image data 501. The image data 501 is encoded to generate the two-dimensional code 801, and the delivery document image data 800 in which the original document image data 310 is combined with the two-dimensional code 801 is printed. When the alteration of the delivery document image data 800 is to be detected, the character area 311 specified from the delivery document image data 800 is compared with the character area in the image data 501 obtained by decoding the two-dimensional code 801. Based on the comparison result, the alteration of the delivery document image data 800 can be detected.

Thus, the alteration of information about a character which is highly likely to be altered can be detected more accurately than ever before. The character information of the delivery document can be packed in as small a size as possible to be used for detecting the alteration. Therefore, the alteration of the delivery document image data 800 can be detected by data with an information amount that is suitable for detecting the alteration more than before.

Further, the present exemplary embodiment performs character recognition. Thus, if dusts or stains are adhered onto the delivery document, erroneous recognition of information which is read by the delivery document to detect the alteration can be reduced more than before. Furthermore, since processing demanding a high reading accuracy, for example the OCR processing, is not necessary, erroneous recognition of the information which is read by the delivery document to detect the alteration can be reduced more than before. Therefore, the present exemplary embodiment can more accurately detect the alteration of the printed matter than before.

According to the present exemplary embodiment, when the alteration of the delivery document image data 800 is detected, the altered character string is output. Thus, the document recipient 104 may be notified which character area 311 in the delivery document image data 800 is altered.

As described above, the character areas 311*a* to 311*f* extracted from the original document image data 310 are packed in as small a size as possible not to be overlapped with each other, to generate the image data 501. Thus, an expansion memory used for decoding the image data 501 can be smaller in size. Further, the character area 311 extracted from the delivery document image data 800 can be compared (subjected to pattern matching) with the character area in the image data 501 obtained by decoding the two-dimensional code 801 at high speed.

A second exemplary embodiment of the present invention will be described. According to the first exemplary embodiment described above, the two-dimensional code 801 obtained by encoding the image data 501 in which the character areas 311 in the original document image data 300 are packed is combined with the original document image data 300 to generate the delivery document image data 800. However, in this case, if the original document includes a large amount of character strings on paper, information to be embedded in the original document image data 300 cannot be reduced enough to be embedded therein. In order to securely solve this situation, parity information of the image data in which the character areas 311 in the original document image data 300 are packed is encoded and added to the delivery document data.

As described above, the present exemplary embodiment is mainly different from the first exemplary embodiment in the point of information to be added to the delivery document data. Thus, components of the present exemplary embodiment which are identical to those of the first exemplary embodiment are denoted by the same reference numerals used in FIGS. 1 to 11, and detailed description thereof will not be repeated. For example, the delivery document generation apparatus of the present exemplary embodiment has the similar configuration to that of the delivery document generation apparatus 100 of the first exemplary embodiment, but an operation performed by the embedded information generation unit 203 of the present exemplary embodiment is different from that of the first exemplary embodiment.

With reference to a flowchart illustrated in FIG. 12, an example of the operation performed by the embedded information generation unit 203 of the delivery document generation apparatus will be described.

In step S1201, the embedded information generation unit 203 generates image data including only all the character areas 311 searched by the character area determination unit 202. Similar to the first exemplary embodiment, a size (sizes of height and width) of the image data generated in step S1201 is smaller than that of the original document image data 300 formed by the document reading unit 201. A method for generating the image data is the same as described in the first exemplary embodiment (refer to FIGS. 6 and 7).

In step S1202, the embedded information generation unit 203 calculates a vertical parity and a horizontal parity of the image data generated in step S1201. The horizontal parity is information indicating whether a number of pixels other than white pixels along each line in a horizontal direction in the image is an even number or an odd number. The vertical parity is information indicating whether a number of pixels other than white pixels along each line in a vertical direction in the image is an even number or an odd number.

Figure 13:
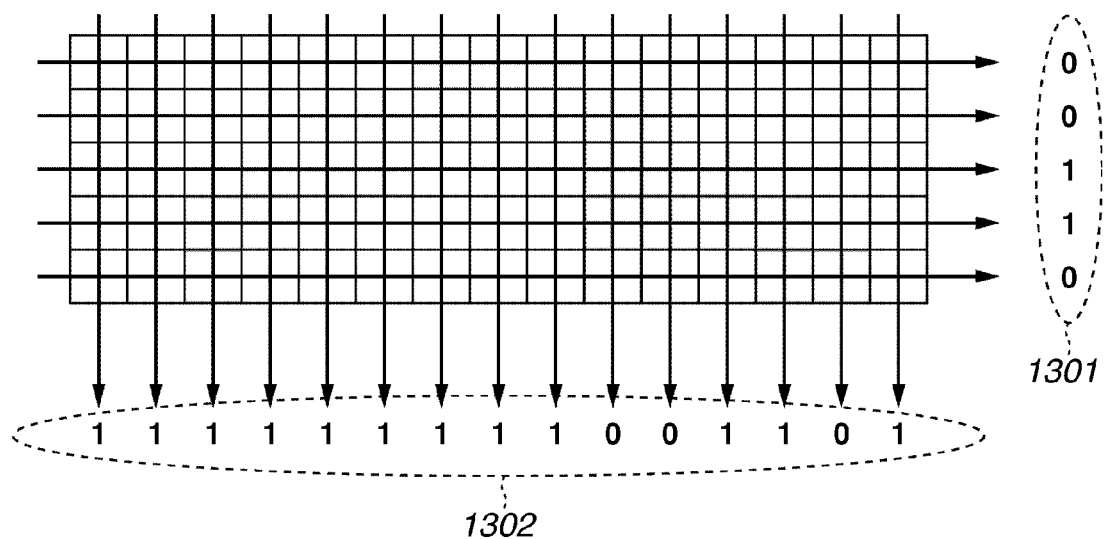
FIG. 13 schematically illustrates an example of a horizontal parity and a vertical parity.

FIG. 13 schematically illustrates an example of the horizontal parity and the vertical parity. In FIG. 13, for example, in a first line in the horizontal direction, a number of the pixels other than the white pixels is three. Thus, the horizontal parity of "0" indicating the odd number is given. In a third line in the horizontal direction, a number of the pixels other than the white pixels is six. Thus, the horizontal parity of "1" indicating the even number is given. The processing in step S1202 as described above is performed to obtain a horizontal parity 1301 and a vertical parity 1302 as illustrated in FIG. 13.

In step S1203, the embedded information generation unit 203 converts the horizontal parity 1301 and the vertical parity 1302 calculated in step S1202 into the two-dimensional code.

Figure 15:
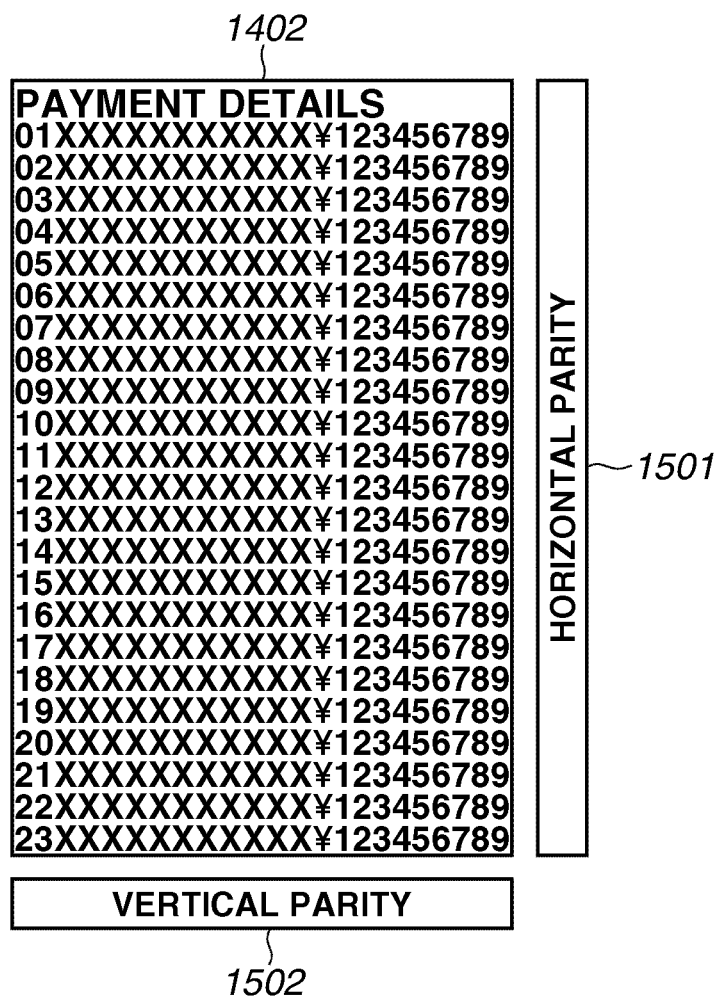
FIG. 15 schematically illustrates an example of the vertical parity and the horizontal parity obtained from the image data illustrated in FIG. 14B.

An example of a specific operation performed by the embedded information generation unit 203 will be described. FIG. 14A illustrates an example of original document image data. FIG. 14B illustrates an example of image data obtained by packing character areas in the original document image data. FIG. 15 schematically illustrates an example of the vertical parity and the horizontal parity obtained from the image data illustrated in FIG. 14B.

The processing in step S1201 is performed on original document image data 1401 illustrated in FIG. 14A to generate image data 1402 illustrated in FIG. 14B.

The embedded information generation unit 203 calculates a horizontal parity 1501 and a vertical parity 1502 from the image data 1402. Subsequently, the embedded information generation unit 203 converts the calculated horizontal parity 1501 and the calculated vertical parity 1502 into the two-dimensional code.

An example of the delivery document check apparatus of the present exemplary embodiment will be described.

Figure 16:
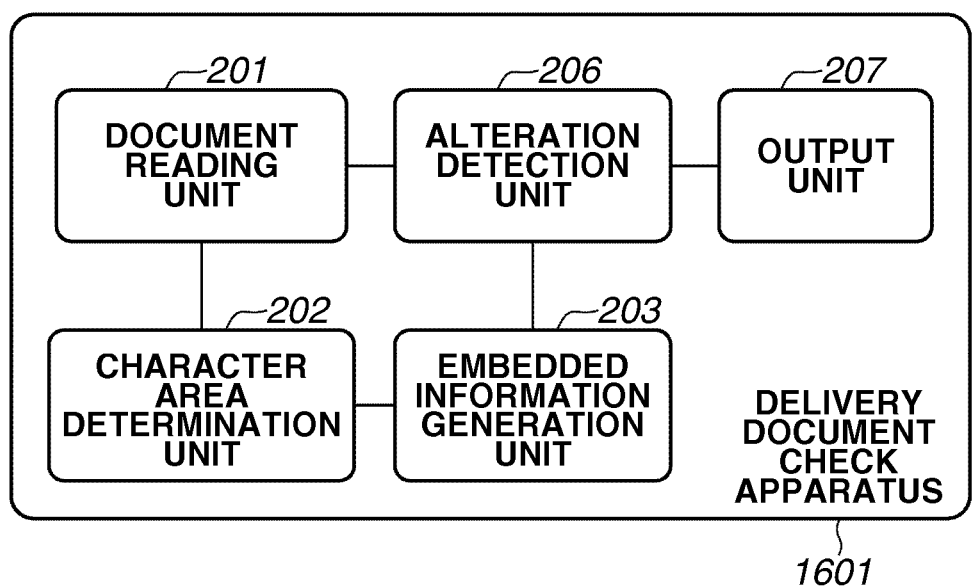
FIG. 16 is a block diagram illustrating an example of a configuration of the delivery document check apparatus.

FIG. 16 is a block diagram illustrating an example of a configuration of the delivery document check apparatus. In FIG. 16, the same reference numerals are given to blocks which have same or similar functions as those described above.

In FIG. 16, a delivery document check apparatus 1601 includes a document reading unit 201, a character area determination unit 202, an embedded information generation unit 203, an alteration detection unit 206, and an output unit 207.

Figure 17:
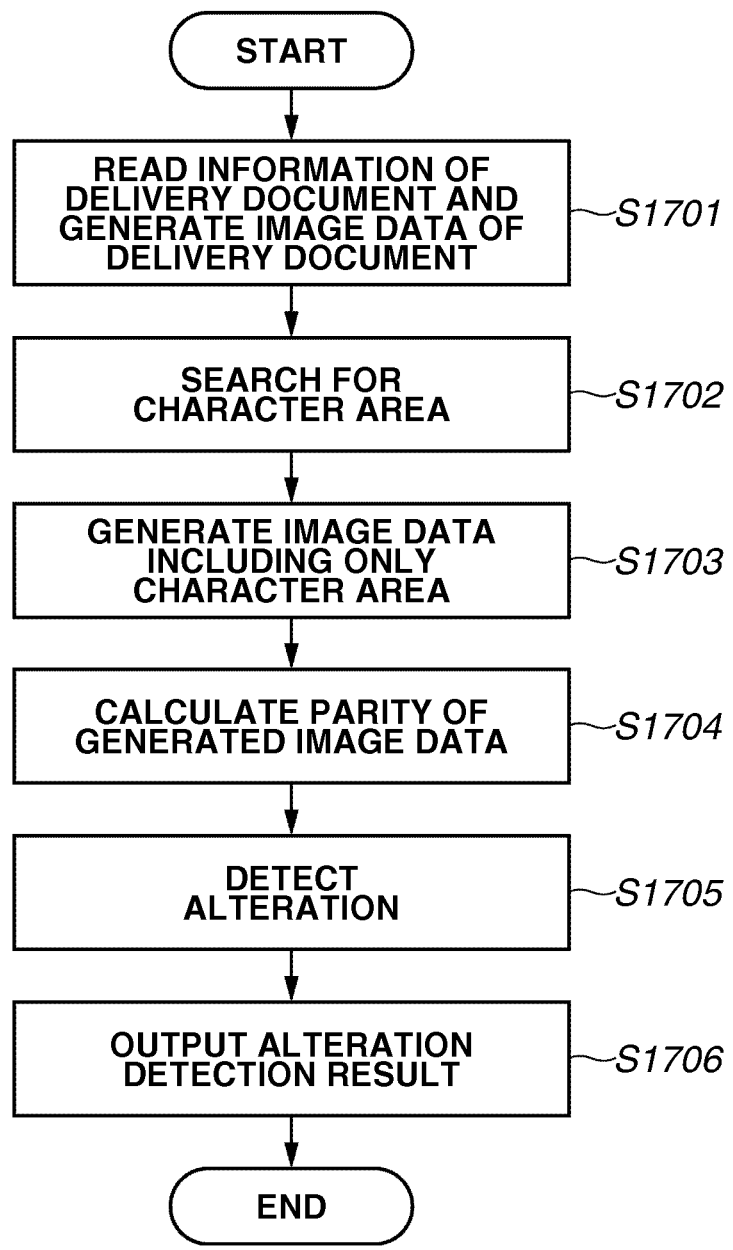
FIG. 17 is a flowchart illustrating an example of an operation performed by the delivery document check apparatus.

With reference to a flowchart illustrated in FIG. 17, an example of an operation performed by the delivery document check apparatus 1601 will be described.

In step S1701, the document reading unit 201 of the delivery document check apparatus 1601 optically scans the delivery document (paper document) that is a target for detecting the alteration and reads information about the delivery document to form the electronic delivery document image data.

In step S1702, the character area determination unit 202 of the delivery document check apparatus 1601 searches the delivery document image data formed in step S1701 for the character areas.

In step S1703, the embedded information generation unit 203 of the delivery document check apparatus 1601 generates image data including only the character areas searched in step S1702. The delivery document check apparatus 1601 generates the image data including only the character areas searched in step S1702 by the same method as that used by the embedded information generation unit 203 of the delivery document generation apparatus 100 in step S1201 illustrated in FIG. 12.

The embedded information generation unit 203 outputs information about a position of the character area (original position of character area) in the delivery document image data, a position of the character area (position of the character area after moved) in the image data including only the character areas, and the height and the width of the character area, for each character area.

Figure 18:
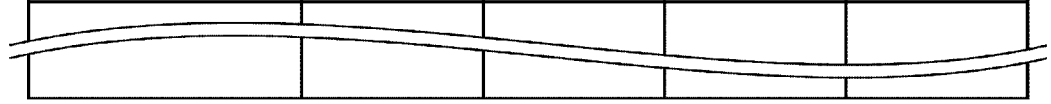
FIG. 18 illustrates an example of information about character areas.

FIG. 18 illustrates an example of information about the character areas.

As illustrated in FIG. 18, the embedded information generation unit 203 outputs information in which a character string 1801 included in the character area, an original position 1802 of the character area, a position 1803 after the character area is moved, and a height 1804 and a width 1805 of the character area are associated with each other for each character area.

In step S1704, the embedded information generation unit 203 of the delivery document check apparatus 1601 calculates the vertical parity and the horizontal parity of the image data generated in step S1703.

In step S1705, the alteration detection unit 206 of the delivery document check apparatus 1601 detects the alteration of the delivery document image data. Processing in step S1705 will be described in detail below.

In step S1706, the output unit 207 of the delivery document check apparatus 1601 outputs (displays) a result of the detection of the alteration performed in step S1705.

Figure 19:
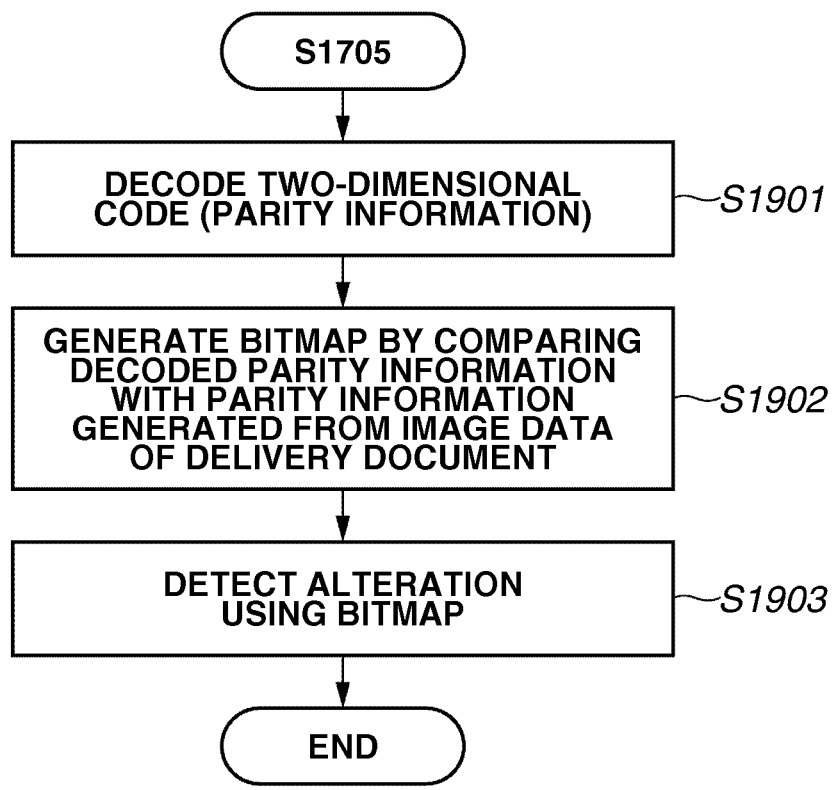
FIG. 19 is a flowchart illustrating an example of a detail operation performed in step S1705.

With reference to a flowchart illustrated in FIG. 19, an example of an operation performed by the alteration detection unit 206 in step S1705 in FIG. 16 will be described in detail.

In step S1901, the alteration detection unit 206 decodes the two-dimensional code included in the delivery document image data formed in step S1701 to obtain information about the parity calculated by the delivery document generation apparatus.

The alteration detection unit 206 compares the parity information calculated by the embedded information generation unit 203 of the delivery document check apparatus 1601 (parity information calculated in step S1704) with the parity information decoded in step S1901. Based on the comparison result, in step S1902, the alteration detection unit 206 forms a binary bitmap in which a pixel whose vertical parity and horizontal parity are different from each other has a value of "1" and a pixel other than that has a value of "0". Contents of the bitmap are not necessarily set as described above. For example, the pixel may have the value of "0" when the vertical parity of the pixel is different from the horizontal parity thereof, and the other pixel may have the value of "1".

The alteration detection unit 206 calculates a number of pixels that have the value of "1" for each character area using information (refer to FIG. 18) about the character area which is output from the embedded information generation unit 203 of the delivery document check apparatus 1601. The alteration detection unit 206 determines whether each of the character areas is altered using the number of calculated pixels.

When a number of the pixels in the character area is equal to or more than a predetermined threshold value, it is determined that the character area is altered. A determination is not limited to the above described method. For example, when a ratio between the size of the character area and the number of calculated pixels is equal to or more than a predetermined threshold value, it may be determined that the character area is altered.

The output unit 207 notifies the document recipient 104 of the result detected as described above. The output unit 207 can modify the character area that is determined to be altered so that the character area can be visually recognized, and can display the modified delivery document image on a user interface. A method for notifying the detection result of the alteration is not limited to the method described above. For example, the output unit 207 may print, on paper, the delivery document image in which the altered character area is modified.

As described above, according to the present exemplary embodiment, the two-dimensional code is generated that includes the encoded horizontal parity 1501 and the encoded vertical parity 1502 (parity values) of the image data 1402 in which the character areas in the original document image data 1401 are packed. Thus, in addition to effects described in the first exemplary embodiment, the present exemplary embodiment can provide an effect, for example, that can make the information to be embedded into the original document image data 1401 smaller than that in the first exemplary embodiment. Accordingly, for example, when the original document includes a large amount of character strings on paper, the two-dimensional code can be more securely embedded into the original document image data 1401 than that in the first exemplary embodiment.

In the present exemplary embodiment, a modified example of the first exemplary embodiment can be also adopted.

A third exemplary embodiment of the present invention will be described. In the present exemplary embodiment, any one of the two-dimensional code obtained by encoding the parity values and the two-dimensional code obtained by encoding the image data is generated according to a result of comparing a predetermined value with an encoded size (amount of information) of the image data obtained by packing the character areas in the original document image data. In other words, in the present invention, according to the encoded size (amount of information) of the image date obtained by packing the character areas in the original document image data, any one of the two-dimensional code according to the first exemplary embodiment and the two-dimensional code according to the second exemplary embodiment is generated.

As described above, the present exemplary embodiment performs processing on the two-dimensional code that is partially different from that of the first and second exemplary embodiments. Thus, components of the present exemplary embodiment which are identical to those of the first and second exemplary embodiments are denoted by the same reference numerals used in FIGS. 1 to 19, and detailed description thereof will not be repeated.

The embedded information generation unit 203 of the delivery document generation apparatus determines whether the code (amount of information) which is obtained by encoding the image data is equal to or more than a predetermined value. The image data is obtained by packing the character areas in step S402 of the flowchart in FIG. 4. The predetermined value is, for example, a maximum value of the code for encoding the image data as the two-dimensional code. The predetermined value may be set in advance, or may be dynamically set according to a difference between a size of the original document image data and that of the character areas.

Figure 12:
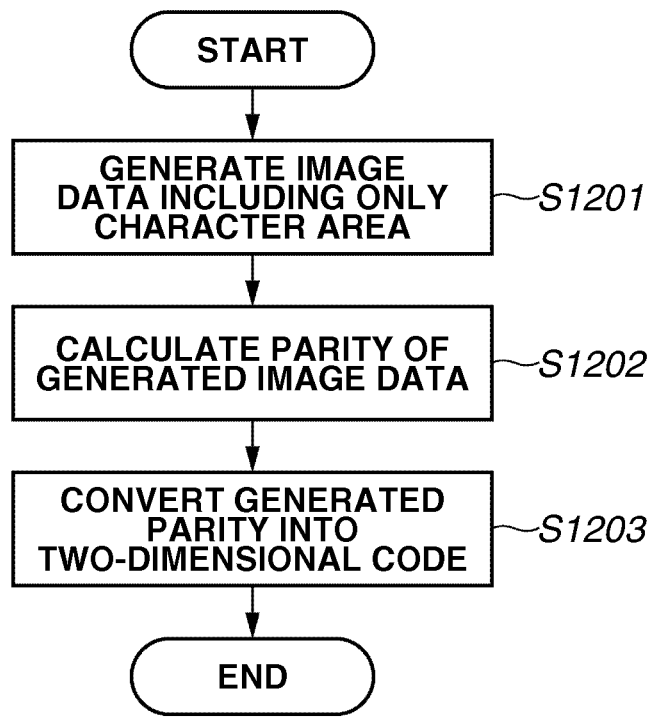
FIG. 12 is a flowchart illustrating an example of an operation performed by the embedded information generation unit of the delivery document generation unit.

As a result of the determination, when the code of the image data obtained by packing the character areas is equal to or more than the predetermined value, as described in step S1202 in FIG. 12, the parity value of the image data is calculated and converted into the two-dimensional code. On the other hand, when the code of the image data obtained by packing the character area is less than the predetermined value, as described in step S402 in FIG. 4, the encoded image data is converted into the two-dimensional code. At this point, the embedded information generation unit 203 adds flag information indicating whether the two-dimensional code is obtained from the image data or the parity, to the two-dimensional code.

When the two-dimensional code included in the delivery document image data that is the target for detecting the alteration is decoded, the delivery document check apparatus refers to contents of the flag and determines whether the two-dimensional code is obtained from the image data or the parity. As a result of the determination, when the two-dimensional code is obtained from the image data, the processing after step S1002 in FIG. 10 will be performed. On the other hand, when the two-dimensional code is obtained from the parity, the processing after step S1902 in FIG. 19 will be performed.

Figure 20:
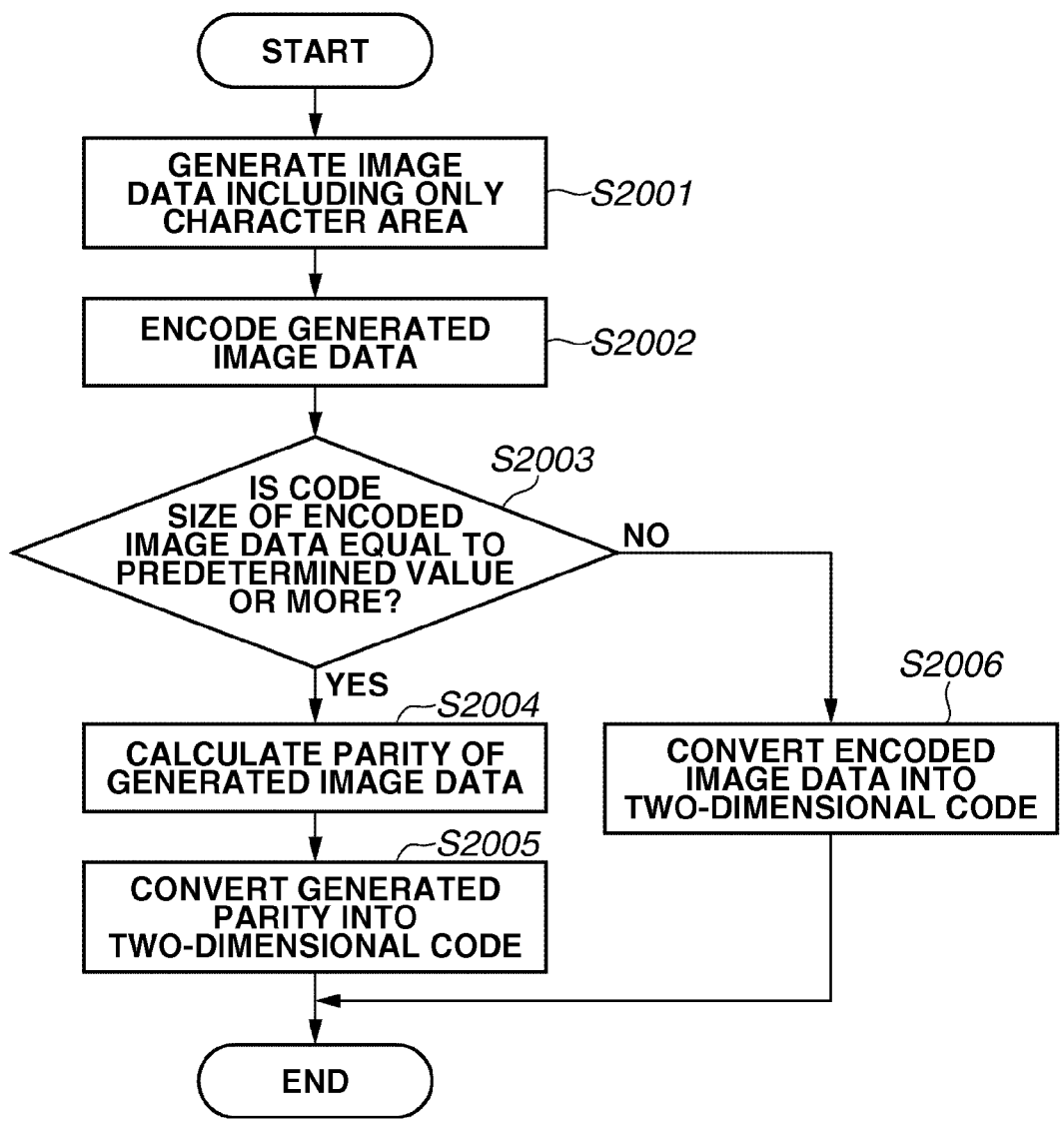
FIG. 20 is a flowchart illustrating an example of an operation performed by the embedded information generation unit of the delivery document generation apparatus.

With reference to a flowchart illustrated in FIG. 20, an example of an operation performed by the embedded information generation unit 203 of the delivery document generation apparatus will be described.

In step S2001, the embedded information generation unit 203 generates image data including only all the character areas searched by the character area determination unit 202. This processing is similar to that performed in step S401 in FIG. 4 and that performed in step S1201 in FIG. 12.

In step S2002, the embedded information generation unit 203 encodes the image data generated in step S2001. This processing is similar to that performed in step S402 in FIG. 4.

In step S2003, the embedded information generation unit 203 determines whether a size of the data (code size) obtained by encoding the image data in step S 2002 is equal to or more than a predetermined value.

As a result of the determination, when the code size is equal to or more than the predetermined value (YES in step S2003), the processing proceeds to step S2004. In step S2004, the embedded information generation unit 203 calculates the vertical parity and the horizontal parity of the image data generated in step S2001. This processing is similar to that performed in step S1202 in FIG. 12.

In step S2005, the embedded information generation unit 203 converts the horizontal parity 1301 and the vertical parity 1302 calculated in step S1202 into the two-dimensional code. This processing is similar to that performed in step S1203 in FIG. 12. However, in step S2005, the embedded information generation unit 203 adds the flag indicating that the converted two-dimensional code is obtained from the parity to the two-dimensional code.

On the other hand, when the code size is less than the predetermined value (NO in step S2003), then in step S2006, the embedded information generation unit 203 converts the encoded result into the two-dimensional code. This processing is similar to that performed in step S403 in FIG. 4. However, in step S2006, the embedded information generation unit 203 adds the flag indicating that the converted two-dimensional code is obtained from the image to the two-dimensional code.

According to the present exemplary embodiment as described above, it is selected whether the two-dimensional code is generated according to the first exemplary embodiment or the second exemplary embodiment depending on the size (amount of information) of the encoded image data obtained by packing the character areas in the original document image data. Therefore, in addition to the effects described in the first and second exemplary embodiments, the present exemplary embodiment can provide an effect in which the two-dimensional code can be appropriately selected according to the original document image data.

In the present exemplary embodiment, a modified example described in the first exemplary embodiment can be also adopted.

According to the present invention, character information included in the document data is formed as the image data having a smaller size than that of the document data, and the image data is converted into the two-dimensional code and combined with the document data. Therefore, by comparing the character information of the printed matter with the character information included in the two-dimensional code, alteration of information about the character that is highly likely to be altered can be detected more accurately than before.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-095124 filed Apr. 9, 2009, which is hereby incorporated by reference herein in its entirety.

What is claimed is:

1. An apparatus comprising:
a specification unit configured to specify character information included in document data;
a generation unit configured to generate image data of the specified character information;
a determination unit configured to determine whether a size of the generated image data is equal to or larger than a predetermined value;
a calculation unit configured to calculate a parity value of the image data, if the size of the image data is determined to be equal to or larger than the predetermined value;
a conversion unit configured to, if the size of the image data is determined not to be equal to or larger than the predetermined value, convert the generated image data into a two-dimensional code, if the size of the image data is determined to be equal to or more than the predetermined value, convert the calculated parity value into a two-dimensional code; and
a printing unit configured to print a printed matter in which the two-dimensional code is combined with the document data.

2. The apparatus according to claim 1,
wherein, when the size of the image data is equal to or more than the predetermined value, the conversion unit adds information indicating that the two-dimensional code is obtained based on the calculated parity value to the two-dimensional code, and
when the size of the image data is less than the predetermined value, the conversion unit adds information indicating that the two-dimensional code is obtained based on the generated image data to the two-dimensional code.

3. The apparatus according to claim 1, wherein the generation unit gathers a plurality of pieces of the character information such that they do not overlap with each other and generates the image data of the character information.

4. A method comprising:
specifying character information included in document data;
generating image data of the specified character information;
determining whether a size of the generated image data is equal to or larger than a predetermined value;
calculating a parity value of the image data, if the size of the image data is determined to be equal to or larger than the predetermined value;
converting, if the size of the image data is determined not to be equal to or larger than the predetermined value, the generated image data into a two-dimensional code, if the size of the image data is determined to be equal to or more than the predetermined value, convert the calculated parity value into a two-dimensional code; and
printing a printed matter in which the two-dimensional code is combined with the document data.

5. The method according to claim 4, further comprising:
when the size of the image data is equal to or more than the predetermined value, adding information indicating that the two-dimensional code is obtained based on the calculated parity value to the two-dimensional code, and
when the size of the image data is less than the predetermined value, adding information indicating that the two-dimensional code is obtained based on the generated image data to the two-dimensional code.

6. The method according to claim 4, further comprising: gathering a plurality of pieces of the character information such that they do not overlap with each other; and generating the image data of the character information.

7. A non-transitory computer readable medium storing a computer-executable program of instructions for causing a computer to perform a method comprising: specifying character information included in document data; generating image data of the specified character information; determining whether a size of the generated image data is equal to or larger than a predetermined value; calculating a parity value of the image data, if the size of the image data is determined to be equal to or larger than the predetermined value; converting, if the size of the image data is determined not to be equal to or larger than the predetermined value, the generated image data into a two-dimensional code, if the size of the image data is determined to be equal to or more than the predetermined value, convert the calculated parity value into a two-dimensional code; and performing printing of a printed matter in which the two-dimensional code is combined with the document data.

8. The non-transitory computer readable medium according to claim 7, further comprising: when the size of the image data is equal to or more than the predetermined value, adding information indicating that the two-dimensional code is obtained based on the calculated parity value to the two-dimensional code, and when the size of the image data is less than the predetermined value, adding information indicating that the two-dimensional code is obtained based on the generated image data to the two-dimensional code.

9. The non-transitory computer readable medium according to claim 7, further comprising: gathering a plurality of pieces of the character information such that they do not overlap with each other; and generating the image data of the character information.

* * * * *